(12) United States Patent
Takebe et al.

(10) Patent No.: US 10,994,510 B2
(45) Date of Patent: May 4, 2021

(54) COMPOSITE STRUCTURE AND METHOD FOR MANUFACTURING SAME

(71) Applicant: TORAY INDUSTRIES, INC., Tokyo (JP)

(72) Inventors: Yoshiki Takebe, Ehime (JP); Masato Honma, Ehime (JP)

(73) Assignee: TORAY INDUSTRIES, INC., Tokyo (JP)

(*) Notice: Subject to any disclaimer, the term of this patent is extended or adjusted under 35 U.S.C. 154(b) by 22 days.

(21) Appl. No.: 16/471,242

(22) PCT Filed: Dec. 20, 2017

(86) PCT No.: PCT/JP2017/045790
§ 371 (c)(1),
(2) Date: Jun. 19, 2019

(87) PCT Pub. No.: WO2018/117181
PCT Pub. Date: Jun. 28, 2018

(65) Prior Publication Data
US 2020/0307148 A1    Oct. 1, 2020

(30) Foreign Application Priority Data

Dec. 22, 2016 (JP) .............................. JP2016-248747

(51) Int. Cl.
*B32B 5/12* (2006.01)
*B32B 7/03* (2019.01)
(Continued)

(52) U.S. Cl.
CPC ............... *B32B 5/12* (2013.01); *B29C 43/20* (2013.01); *B29C 70/14* (2013.01); *B29C 70/34* (2013.01);
(Continued)

(58) Field of Classification Search
CPC .... B32B 5/12; B32B 5/26; B32B 7/03; B32B 7/02; B32B 3/266; B32B 27/08;
(Continued)

(56) References Cited

U.S. PATENT DOCUMENTS

| 4,894,281 A | 1/1990 | Yagi et al. |
| 9,962,904 B2 | 5/2018 | Hatanaka et al. |

(Continued)

FOREIGN PATENT DOCUMENTS

| CN | 88103280 A | 12/1988 |
| CN | 101407114 A | 4/2009 |

(Continued)

OTHER PUBLICATIONS

Google Patent Translation of JPH06320655A (Year: 2020).*
(Continued)

*Primary Examiner* — Michael Zhang
(74) *Attorney, Agent, or Firm* — Birch, Stewart, Kolasch & Birch, LLP

(57) ABSTRACT

A composite structure includes a structure that contains first reinforced fibers and first resin and a laminate that is disposed on at least one surface of the structure and has a plurality of layers containing second reinforced fibers and second resin, with the structure and the laminate integrated, the first reinforced fibers being discontinuous fibers and having a thickness-wise average fiber orientation angle in a range of 5 to 60°, the second reinforced fibers being discontinuous fibers and having a thickness-wise average fiber orientation angle in a range of 0 to 5°, the structure having a density in a range of 0.01 to 1 g/cm³, the laminate having a variation in volume content of the second reinforced fibers in a range of 0 to 10%, and the composite structure having a protruding portion on a laminate's surface opposite from a laminate's surface in contact with the structure.

15 Claims, 3 Drawing Sheets

(51) Int. Cl.
- B29C 43/20 (2006.01)
- B29C 70/14 (2006.01)
- B29C 70/34 (2006.01)
- B29C 70/46 (2006.01)
- B32B 3/26 (2006.01)
- B32B 5/26 (2006.01)
- B32B 7/02 (2019.01)
- B32B 27/08 (2006.01)
- B32B 38/00 (2006.01)

(52) U.S. Cl.
CPC ............ *B29C 70/46* (2013.01); *B32B 3/266* (2013.01); *B32B 5/26* (2013.01); *B32B 7/02* (2013.01); *B32B 7/03* (2019.01); *B32B 27/08* (2013.01); *B32B 2038/0076* (2013.01); *B32B 2260/023* (2013.01); *B32B 2260/046* (2013.01); *B32B 2262/106* (2013.01); *B32B 2305/08* (2013.01); *B32B 2307/52* (2013.01); *B32B 2307/546* (2013.01); *B32B 2307/718* (2013.01); *B32B 2307/72* (2013.01); *B32B 2307/738* (2013.01)

(58) Field of Classification Search
CPC ...... B32B 2038/0076; B32B 2260/023; B32B 2260/046; B32B 2262/106; B32B 2305/08; B32B 2307/52; B32B 2307/546; B32B 2307/718; B32B 2307/72; B29C 70/14; B29C 70/34; B29C 70/46
See application file for complete search history.

(56) References Cited

U.S. PATENT DOCUMENTS

| | | | |
|---|---|---|---|
| 2005/0029707 A1* | 2/2005 | Kasai | B29C 70/50 264/258 |
| 2010/0028616 A1 | 2/2010 | Yamanouchi et al. | |
| 2011/0192531 A1 | 8/2011 | Sekido et al. | |
| 2012/0291285 A1 | 11/2012 | Kamaraj et al. | |
| 2014/0356612 A1 | 12/2014 | Sano et al. | |
| 2015/0376353 A1 | 12/2015 | Takebe et al. | |
| 2016/0297185 A1 | 10/2016 | Nagasaka et al. | |
| 2016/0303824 A1 | 10/2016 | Takebe et al. | |
| 2017/0157889 A1 | 6/2017 | Ishikawa et al. | |

FOREIGN PATENT DOCUMENTS

| | | | |
|---|---|---|---|
| CN | 101516613 A | | 8/2009 |
| CN | 104066783 A | | 9/2014 |
| CN | 104781317 A | | 7/2015 |
| JP | 53-85875 A | | 7/1978 |
| JP | 6-320655 A | | 11/1994 |
| JP | H06320655 A | * | 11/1994 |
| JP | 2002-192670 A | | 7/2002 |
| JP | 2007-168272 A | | 7/2007 |
| JP | 2010-214704 A | | 9/2010 |
| JP | 2012-35534 A | | 2/2012 |
| JP | 2014125532 A | | 7/2014 |
| JP | 2014-519997 A | | 8/2014 |
| JP | 2015-39842 A | | 3/2015 |
| JP | 2016-179647 A | | 10/2016 |
| WO | WO 2012/101192 A1 | | 8/2012 |
| WO | WO 2014/162873 A1 | | 10/2014 |
| WO | WO 2015/029634 A1 | | 3/2015 |
| WO | WO 2015/083707 A1 | | 6/2015 |
| WO | WO 2015/083820 A1 | | 6/2015 |

OTHER PUBLICATIONS

Extended European Search Report, dated Jul. 15, 2020, for European Application No. 17883277.0.
Chinese Office Action and Search Report for Chinese Application No. 201780077587.8, dated Sep. 9, 2020, with English translation of the Office Action.
Russian Office Action and Search Report for Russian Application No. 2019122813, dated Jan. 19, 2021, with an English translation.
International Search Report, issued in PCT/JP2017/045790, PCT/ISA/210, dated Apr. 3, 2018.
Written Opinion of the International Searching Authority, issued in PCT/JP2017/045790, PCT/ISA/237, dated Apr. 3, 2018.

* cited by examiner

COMPOSITE STRUCTURE AND METHOD FOR MANUFACTURING SAME

TECHNICAL FIELD

The present invention relates to a composite structure including a structure that contains reinforced fibers and resin and a laminate that is disposed on at least one surface of the structure and has a plurality of layers containing reinforced fibers and resin, and relates to a method for manufacturing the composite structure.

BACKGROUND ART

Recently, improved rigidity and lightness are increasingly required of industrial products such as an automobile, an aircraft, and a sport product in the market year after year. In order to meet such a requirement, fiber-reinforced plastic having excellent rigidity and lightness are being widely used for various industrial purposes. Specifically, in order to satisfy the lightness and the rigidity, studied is using a light fiber-reinforced substrate as a core material of a sandwich structure (see Patent Document 1). On the other hand, as a technique that involves a fiber-reinforced plastic laminate formed in consideration of shape formativeness, a disclosed technique is disposing a so-called prepreg formed of continuous reinforced fibers and resin on a surface of a resin sheet material having a filler blended therein (see Patent Document 2). Further, as a technique of improving the formativeness into a plurality of shapes, disclosed is a laminated substrate obtained by laminating a sheet-shaped product with voids on at least one surface of a prepreg containing reinforced fibers and thermoplastic (see Patent Document 3).

PRIOR ART DOCUMENTS

Patent Documents

Patent Document 1: WO 2015/029634
Patent Document 2: WO 2015/083707
Patent Document 3: WO 2015/083820

SUMMARY OF THE INVENTION

Problems to be Solved by the Invention

The method described in Patent Document 1, however, requires consideration of the shape formativeness of a skin material to form complicated plural shapes for manufacturing various products. The method described in Patent Document 2 is a technique of providing, on the prepreg, a cut that causes a flow of the resin sheet material for shaping in a molding step. The resin sheet, however, requires blending of a high-density inorganic filler to secure mechanical properties and thus does not contribute to reduction of weight. Further, the method described in Patent Document 3 eliminates voids in molding the laminated substrate into a molded article, thus achieving no reduction of weight.

Under the circumstances described above, an urgent need is providing a composite structure that satisfies the rigidity and the lightness and also has excellent shape formativeness in consideration of productization. Thus, the present invention has been made in view of the above problems, and an object of the present invention is to provide a composite structure having excellent flexural rigidity, lightness, and shape formativeness, and a method for manufacturing the composite structure.

Solutions to the Problems

The present invention to solve the above problems is as follows.

A composite structure including a structure that contains first reinforced fibers and first resin and a laminate that is disposed on at least one surface of the structure and has a plurality of layers containing second reinforced fibers and second resin, with the structure and the laminate integrated, the first reinforced fibers being discontinuous fibers and having a thickness-wise average fiber orientation angle in a range of 5 to 60°, the second reinforced fibers being discontinuous fibers and having a thickness-wise average fiber orientation angle in a range of 0 to 5°, the structure having a density in a range of 0.01 to 1 g/cm$^3$, the laminate having a variation in volume content of the second reinforced fibers in a range of 0 to 10%, and the composite structure having a protruding portion on a laminate's surface opposite from a laminate's surface in contact with the structure.

Effects of the Invention

According to the present invention, it is possible to provide a composite structure having excellent rigidity, lightness, and shape formativeness, and a method for manufacturing the composite structure.

EMBODIMENTS OF THE INVENTION

Hereinafter, described are a composite structure and a method for manufacturing the composite structure according to the present invention.

The present invention is a composite structure including a structure that contains first reinforced fibers and first resin and a laminate that is disposed on at least one surface of the structure and has a plurality of layers containing second reinforced fibers and second resin, with the structure and the laminate integrated.

The present invention is not particularly limited in terms of the disposition relationship between the laminate and the structure in the composite structure as long as the laminate is disposed on at least one surface of the structure. Generally, it is possible to employ a canape structure attained by disposing a laminate on one surface side of a structure or a sandwich structure that is a structure attained by sandwiching a structure with laminates. The sandwich structure is preferable from a viewpoint of retaining mechanical properties, and the canape structure is preferable from a viewpoint of achieving lightness while securing minimal mechanical properties.

The composite structure has a protruding portion on a laminate's opposite surface from a laminate's surface in contact with the structure, with the protruding portion protruding from the laminate's opposite surface. The protruding portion refers to a portion protruding in an out-of-plane direction from a flat or curved surface portion of the composite structure. The disposition of the protruding portion on the laminate enables securement of the mechanical properties and expansion of structure designing in productization. Without the protruding portion, that is, the composite structure only formed of a plate shape or a semispherical shape comes to have limitation on designing in terms of flexural rigidity.

The protruding portion is preferably a rib and/or a boss from viewpoints of shape formativeness of the composite structure and mechanical properties of the composite structure that has been formed into a shape. The provision of a rib and or a boss in the composite structure is preferable because it is capable of imparting a shape-dependent rigidity improving effect to the flexural rigidity. That is, it is possible to make the composite structure to exert flexural rigidity larger than the flexural rigidity derived from the structure and the laminate.

Figure 1:
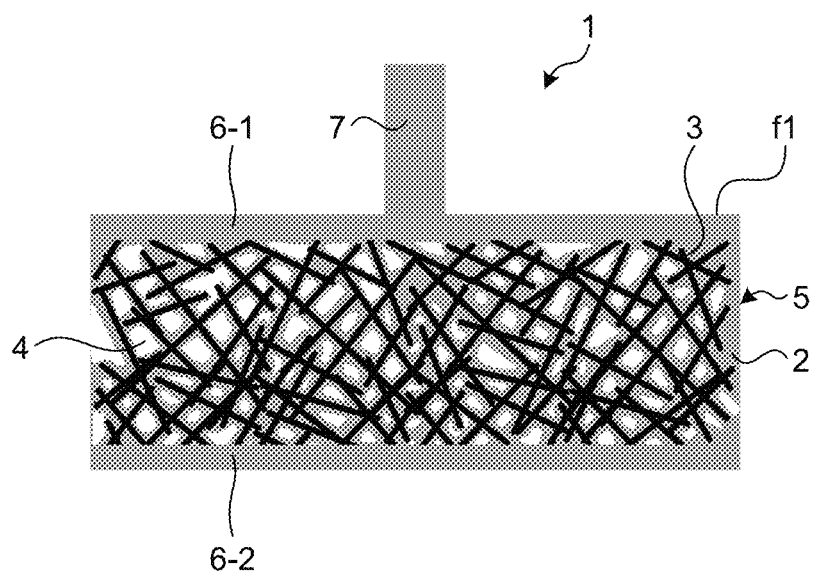
FIG. 1 is a schematic view showing a sectional configuration of a composite structure according to an embodiment of the present invention.

FIG. 1 is a schematic view showing a sectional configuration of a composite structure 1 according to an embodiment of the present invention. The composite structure 1 includes a structure 5 that contains first resin 2, fist reinforced fibers 3, and voids 4, laminates 6-1 and 6-2 that are disposed on a front side and a rear side of the structure 5, respectively, and a rib 7 that is provided on a flat surface f1 opposite from a front-side laminate 6-1's surface in contact with the structure 5 and protrudes from the flat surface f1. The rib 7 corresponds to the protruding portion in the present invention. FIG. 1 does not show the second resin and the second reinforced fibers contained in the laminates 6-1 and 6-2. The rib 7 is provided in a center portion of the flat surface f1 over the entire length-wise distance (from one end to the other end) of the laminate 6-1. The rib, however, may be provided only in one length-wise portion. The rib 7 is linear but is not limited to this shape, and the rib may be zigzag-shaped or wave-shaped. Further, a plurality of ribs 7 may be provided in parallel or the rib may also be provided in a lattice shape. Further, when the composite structure is semispherical, it is possible to provide the rib in a radial shape extending from the center of the semisphere.

Figure 2:
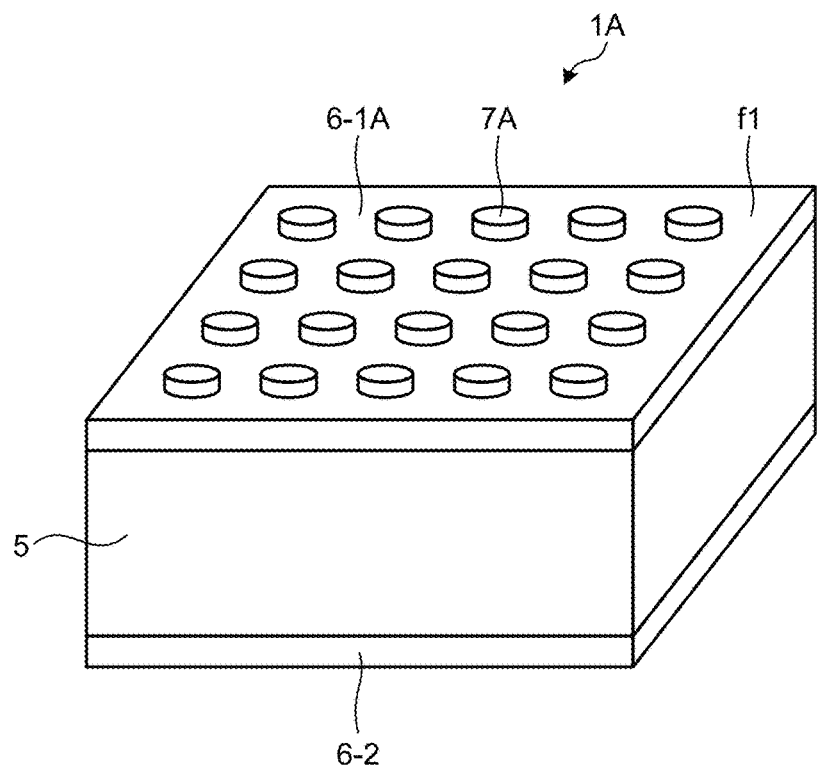
FIG. 2 is a perspective view of a composite structure according to a modified example 1 of the embodiment of the present invention.

FIG. 2 is a perspective view of a composite structure 1A according to a modified example 1 of the embodiment of the present invention. In the composite structure 1A, laminates 6-1A and 6-2 are disposed on a front side and a rear side of the structure 5, respectively, and a plurality of bosses 7A are provided on the flat surface f1 opposite from a front-side laminate 6-1A's surface in contact with the structure 5 and protrude from the flat surface f1. The bosses 7A correspond to the protruding portion. The bosses 7A are columnar but are not limited to this shape, and the bosses may be prismatic column-shaped such as a hexagonal column shape and may be hollow.

Figure 3:
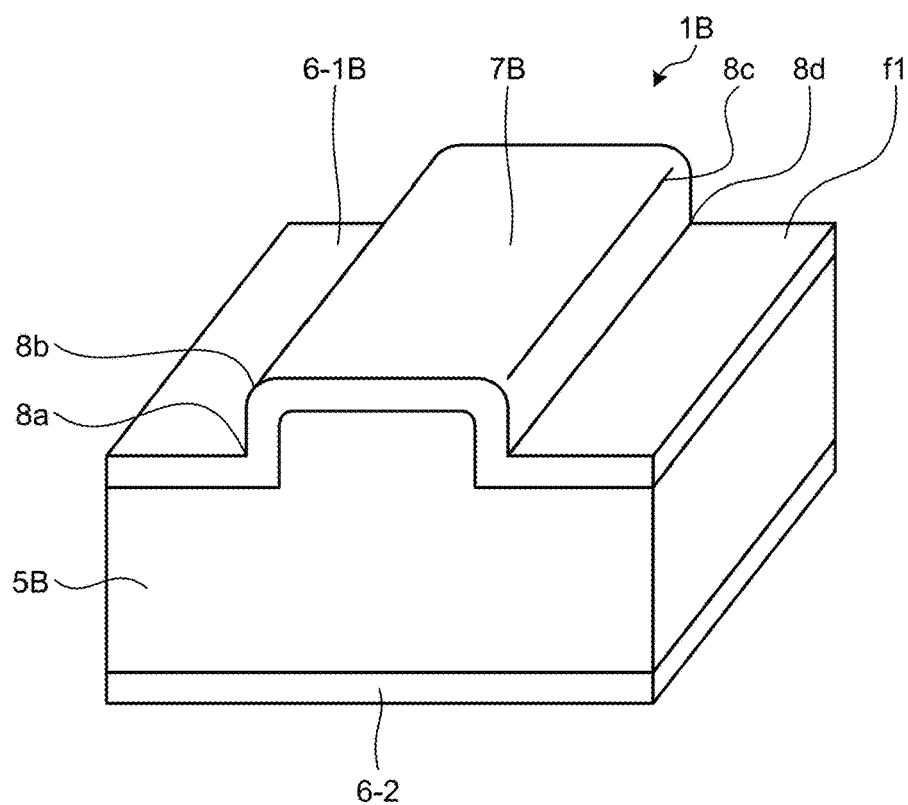
FIG. 3 is a perspective view of a composite structure according to a modified example 2 of the embodiment of the present invention.
Figure 4:
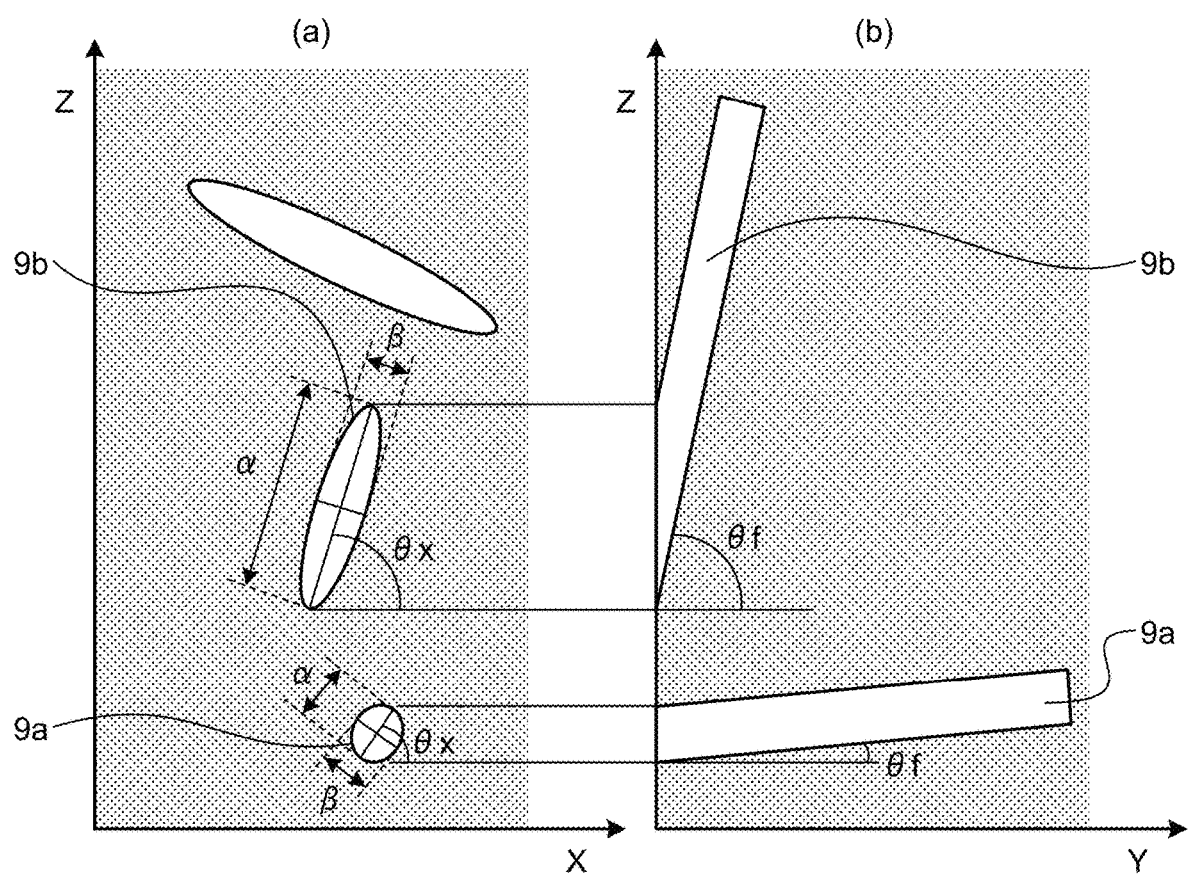
FIG. 4 is schematic views showing one exemplary thickness-wise sectional configuration of a composite structure according to the present invention.

FIG. 3 is a perspective view of a composite structure 1B according to a modified example 2 of the embodiment of the present invention. In the composite structure 1B, laminates 6-1B and 6-2 are disposed on a front side and a rear side of the structure 5B, respectively, and a protruding portion 7B is formed on the flat surface f1 opposite from a front-side laminate 6-1B' surface in contact with the structure 5B. The protruding portion 7B is formed by flexures $8a$, $8b$, $8c$, and $8d$ flexed at a nearly right angle. In the modified example 2, the flexures are flexed at a nearly right angle, allowing the protruding portion to protrude outward from the plane of the laminate. The flexure angle, however, may be an acute angle or an obtuse angle and the flexure direction may be toward the inside of the laminate. The protruding portion that is rectangular as shown in FIG. 3 may also be hat-shaped or corrugated plate-shaped. The rib, the bosses, and the protruding portion function as, for example, a reinforcing part and also correspond to a place for storing or setting functional components such as a screw.

In the present invention, 80 vol % or more and 100 vol % or less of the protruding portion preferably contains the laminate. The protruding portion containing the laminate in an amount of 80 vol % or more and 100 vol % or less enables preferable exertion of the mechanical properties, particularly the flexural modulus contributing to the flexural rigidity. From the above viewpoint, the protruding portion has a volume content of the laminate of further preferably 90 vol % or more and 100 vol % or less, particularly preferably 100 vol %.

The composite structure according to the present invention preferably has an area ratio (As)/(Ap) in a range of more than 1 and 2.5 or less between a projected area (Ap) of a surface (referred to as a plane of projection) having the protruding portion of the composite structure and an actual survey area of the plane of projection (As), from a viewpoint of easy-production of the composite structure and from a viewpoint of obtaining a sufficient value for the flexural rigidity of the composite structure. For example, in the composite structure 1A of FIG. 2, the projected area (Ap) is the area of the flat surface f1 of the laminate 6-1A, and the actual survey area (As) is a sum of a total of the area of the bosses 7A's side surfaces and the area of the flat surface f1 of the laminate 6-1A. The composite structure having a ratio (As)/(Ap) of more than 1 is preferable because it suggests its capability of producing the protruding portion other than the plate shape and thus makes it possible to broaden the range of product designing. From the above viewpoint, the ratio (As)/(Ap) is more preferably in a range of more than 1 and 1.5 or less. With the ratio (As)/(Ap) set in the range of more than 1 and 2.5 or less, the composite structure including the laminate and the structure has a remarkable effect of having high shaping performance.

Further, with the mass average fiber length of the second reinforced fibers contained in the laminate defined as Ls and the mass average fiber length of the first reinforced fibers contained in the structure defined as Lc, the composite structure preferably has a ratio Ls/Lc in a range of 1 to 50 for its excellent shape formativeness. The composite structure having the ratio in such a range have no large difference in length between the second reinforced fibers in the laminate and the first reinforced fibers in the structure to allow the laminate to follow the shape of a product. With the ratio Ls/Lc set in the above range, when the second reinforced fibers in the laminate are, together with the second resin, deformed into a shape of the protruding portion, it is possible to reduce inhibition of the laminate's deformation by the first reinforced fibers in the structure. That is, it is possible to prevent the structure from pushing out the laminate that is supposed to be disposed in the protruding portion and entering into the protruding portion (for example, a rectangular shape portion). From the above viewpoint, the ratio Ls/Lc is preferably 1 to 30, particularly preferably 1 to 15.

[Laminate]

The laminate included in the composite structure according to the present invention has a plurality of layers containing the second reinforced fibers and the second resin. The number of layers in the laminate is not particularly limited as long as it is plural, or two or more. A laminate having only one layer is insufficient in formativeness and has trouble forming a desired shape when the composite structure is produced, so that the number of layers in the laminate is plural.

The number of layers in the laminate is not particularly limited as long as it is two or more. The layers in the laminate, however, are preferably quasi-isotropically laminated from a viewpoint of homogenizing the flexural modulus that contributes to the flexural rigidity. Specifically, in order to homogeneously obtain a high flexural rigidity, the layers in the laminate preferably attain cross lamination with a unit of [0/90] or isotropic lamination with a unit of [+45/0/−45/90] or [0/±60].

The second reinforced fibers of the laminate included in the composite structure according to the present invention are discontinuous fibers and have a thickness-wise average fiber orientation angle in a range of 0° to 5° in the closest layer to the structure. The second reinforced fibers that are discontinuous fibers facilitate formation of the laminate into a complicated shape when an external force is applied to the laminate for molding. Further, the second reinforced fibers having a thickness-wise average fiber orientation angle in the range of 0° to 5° in the closest layer to the structure make the laminate itself have excellent mechanical properties, particularly a flexural property. The second reinforced fibers having a thickness-wise average fiber orientation angle of more than 5° are too much thickness-wise oriented to satisfy the flexural property in some cases. The second reinforced fibers preferably have an average fiber orientation angle of 3° or less in the closest layer to the structure from a viewpoint of further satisfying the mechanical properties.

Here, it is possible to obtain the thickness-wise average fiber orientation angle of the second reinforced fibers in the closest layer to the structure by obtaining the orientation angles of the second reinforced fibers in the closest layer to the structure in the laminate's sectional direction (thickness direction). The average fiber orientation angle is the degree of inclination with respect to the laminate's sectional direction, in other words, the degree of inclination of the reinforced fibers with respect to the laminate's thickness direction. The reinforced fibers having a larger value for the average fiber orientation angle suggest their state of being inclined nearer to upright along the thickness direction, and the value is given in a range of 0° or more and 90° or less. That is, the second reinforced fibers having a thickness-wise average fiber orientation angle in the range of 0° to 5° in the closest layer to the structure are capable of more effectively exerting a reinforcing function in the laminate. The second reinforced fibers have a thickness-wise average fiber orientation angle of 5° or less in the closest layer to the structure in view of exertion of the flexural rigidity when formed into the laminate. The second reinforced fibers more preferably have a thickness-wise average fiber orientation angle of 3° or less.

In the present invention, the laminate integrated with the structure to form the composite structure has a variation in volume content of the second reinforced fibers in a range of 0 to 10%. This setting homogenizes the mechanical properties represented by the flexural modulus. The laminate having a variation in volume content of the second reinforced fibers of 0 to 10% suggests its state of being small in variability in volume content of the second reinforced fibers depending on the measured location when formed into the composite structure. In other words, such a laminate shows a preferable result for easy designing of a final product and shape stability. From the above viewpoint, the laminate has a variation in volume content of the second reinforced fibers of preferably 5% or less, more preferably 0%.

Here, it is possible to obtain the variation in volume content of the second reinforced fibers by a known method. For example, the density of the laminate extracted from the composite structure is measured in advance by a water substituted method, a coefficient of variation (CV value (%)) as an indicator of the variability is calculated from an average value of measured volume contents, the number of measured pieces, and a standard deviation, and the coefficient of variation is applicable as the variation in volume content.

Each layer in the laminate of the present invention has substantially all the second reinforced fibers thereof divided by a cut. The second reinforced fibers divided by the cut preferably have a mass average fiber length Ls in a range of 10 to 100 mm. The division of the second reinforced fibers by the cut facilitates deformation of the second reinforced fibers together with the second resin in the laminate when the composite structure is obtained, to improve the formativeness. Each layer in the laminate is preferably one obtained by making a cut on a unidirectional prepreg formed of the second reinforced fibers unidirectionally arranged and the second resin or on a woven fabric prepreg formed of warp and weft, to exert excellent flexural rigidity and an excellent effect for variation in volume content of the laminate in the protruding portion and for formativeness of the laminate into the protruding portion.

The phrase "substantially all the second reinforced fibers thereof divided by a cut" indicates that as regards the second reinforced fibers in each layer included in the laminate, second reinforced fibers not divided by the cut has an area proportion of less than 5% in the area accounted for by the layer.

The second reinforced fibers divided by the cut have a mass average fiber length Ls preferably in a range of 10 to 100 mm in terms of balance between the formativeness and the mechanical properties; further preferably in a range of 20 to 60 mm. The laminate sometimes contains a second reinforced fiber shorter than the mass average fiber length Ls. The laminate, however, is more preferable according as the number of second reinforced fibers having a length of less than 10 mm or more than 100 mm is small, and the second reinforced fibers having a length of less than 10 mm or more than 100 mm preferably have an area proportion of less than 5% in the area accounted for by the layer containing the second reinforced fibers.

Each layer forming the laminate preferably has a thickness in a range of 30 to 300 μm. Each layer in the laminate of the present invention has a cut, so that when the layer to be divided has a large thickness, the productivity tends to be decreased. Therefore, it is preferable to set the thickness of each layer at 300 μm or less. On the other hand, each layer having a thickness of less than 30 μm causes no problem, but stable manufacturing of very thin layers is quite difficult. Therefore, from a viewpoint of productivity, each layer preferably has a thickness of 30 μm or more. From a viewpoint of productivity, each layer further preferably has a thickness of 50 to 150 μm.

The laminate of the present invention is, as described above, a laminate that has a plurality of layers containing the second reinforced fibers and the second resin. The laminate preferably has, for its excellent flexural rigidity, an angle in a range of 4° or more and 90° or less between the orientation direction of the second reinforced fibers in one layer and the orientation direction of the second reinforced fibers in another layer adjacent to the one layer in the laminate. The laminate having excellent flexural rigidity is preferable because it results in enabling improvement in flexural rigidity of the composite structure.

Each layer in the laminate preferably has an absolute value of an angle θ between the cut and the second reinforced fibers of 2 to 25° from a viewpoint of formativeness. Each layer having an absolute value of 25° or less exerts a preferable effect of improving the mechanical properties. On the other hand, each layer having an absolute value of the angle θ of 2° or less is capable of obtaining flowability and the mechanical properties, but it is sometimes difficult to stably make such a cut. This is because a cut at an acute angle with respect to the second reinforced fibers makes the contact of the second reinforced fibers with a blade unstable in making the cut. In addition, with the absolute value of the angle θ being less than 2°, provision of the second reinforced fibers having a mass average fiber length Ls of 10 to 100 mm at least excessively reduces the distance between cuts to lack production stability. A small distance between cuts also causes a problem of making handling of the laminate difficult. Therefore, each layer in the laminate preferably has an absolute value of the angle θ between the cut and the second reinforced fibers of 2 to 25°, and further preferably has an absolute value in a range of 5 to 15° in view of the relationship between easy control of the cut and the flexural rigidity.

Each layer included in the laminate preferably has a fiber volume content of the second reinforced fibers in a range of 45 to 65% from a viewpoint of exerting the flexural rigidity. Each layer having a fiber volume content of the second reinforced fibers of less than 45% is small in amount of the second reinforced fibers necessary for exerting the flexural rigidity of the laminate to be inferior in flexural rigidity. On the other hand, each layer having a fiber volume content of the second reinforced fibers of more than 65% is not preferable because this makes it difficult to impregnate the second reinforced fibers with the second resin in manufacturing the laminate.

A method for inserting a cut on the laminate of the present invention includes first producing a laminate precursor (so-called a prepreg) obtained by impregnating the second reinforced fibers, which have been unidirectionally arranged and continuous, with the second resin. Thereafter, exemplified is a method for making a cut on the prepreg manually with a cutter or by a cutting machine or a method for continuously pressing on the prepreg a rotary roller having a blade disposed at a prescribed position thereof. As the prepreg, a tape-shaped prepreg may be completely divided, and then re-aligned in a desired configuration or then randomly disposed by free drop from a certain height. On the other hand, the second reinforced fibers having a cut made thereon may be impregnated with the second resin.

Each layer in the laminate of the present invention preferably contains carbon fibers as the second reinforced fibers and thermoset resin as the second resin. Use of carbon fibers as the second reinforced fibers is preferable from a viewpoint of enabling formation of the laminate excellent in balance between the flexural modulus and the density. Use of thermoset resin as the second resin is preferable from a viewpoint of reliability in mechanical properties of the laminate obtained and for easy production of the laminate.

[Structure]

The structure of the present invention has a density in a range of 0.01 to 1 g/cm³. The structure having a density ρ of more than 1 g/cm³ is not preferable because it means an increase in mass of the structure, resulting in causing an increase in mass of the composite structure formed. The structure having a density of less than the lower limit value 0.01 g/cm³ is excellent in density of the structure itself but have an excessively small volume proportion of the first reinforced fibers and the first resin in the structure to make it difficult to retain the mechanical properties. The structure preferably has a density of 0.03 g/cm³ or more from a viewpoint of retaining the mechanical properties of the structure. Further, the structure preferably has a density of 0.1 g/cm³ or more in view of balance between the density and the mechanical properties.

The first reinforced fibers in the structure that are discontinuous fibers and have a mass average fiber length of 1 to 15 mm are preferable because they are capable of increasing reinforcing efficiency of the first reinforced fibers for the structure and giving excellent mechanical properties to the structure. The first reinforced fibers having a mass average fiber length of 1 mm or more are preferable because they are capable of efficiently forming voids in the structure to enable a decrease in density, in other words, such first reinforced fibers facilitate acquisition of the structure having a desired thickness while keeping the same mass. On the other hand, the first reinforced fibers having a mass average fiber length of 15 mm or less are preferable because they are less likely to be flexed by their own weight in the structure not to inhibit exertion of the mechanical properties. It is possible to measure the mass average fiber length of the first reinforced fibers in the same manner as the mass average fiber length of the second reinforced fibers.

In the present invention, for controlling the density of the structure in the range of 0.01 to 1 g/cm³, the structure preferably contains voids.

Here, the voids refer to spaces formed by first resin-coated first reinforced fibers being columnar supporting bodies and overlapping or crossing with each other. For example, when the first reinforced fibers are impregnated with the first resin in advance to form a structure precursor and the structure precursor is heated to give the structure, melting or softening of the first resin by the heating raises the first reinforced fibers to form the voids. This phenomenon is based on the first reinforced fibers' character of rising by a rising force derived from the elastic modulus of the first reinforced fibers that have been compressed by pressure in the structure precursor.

Further, the structure containing the voids preferably has a volume content of the first reinforced fibers of 0.5 vol % or more and 55 vol % or less, a volume content of the first resin of 2.5 vol % or more and 85 vol % or less, and a volume content of the voids of 10 vol % or more and 97 vol % or less, with the total volume of the first reinforced fibers, the first resin, and the voids defined as 100 vol %. These conditions are described.

The structure preferably has a volume content of the first reinforced fibers in the range of 0.5 vol % or more and 55 vol % or less from a viewpoint of satisfying a reinforcing effect of the first reinforced fibers in the structure and satisfying the lightness. The structure having a volume content of the first reinforced fibers of 0.5 vol % or more is preferable because it is cap-able of making the reinforcing effect derived from the first reinforced fibers sufficient. On the other hand, the structure having a volume content of the first reinforced fibers of 55 vol % or less is preferable because it relatively increases the volume content of the first resin with respect to the volume content of the first reinforced fibers and allows the first reinforced fibers in the structure to be bound with each other to be capable of making the reinforcing effect of the first reinforced fibers sufficient and thus satisfying the mechanical properties, particularly the flexural property of the structure.

The structure preferably has a volume content of the first resin in the range of 2.5 vol % or more and 85 vol % or less. The structure having a volume content of the first resin of 2.5 vol % or more is preferable because it allows the first reinforced fibers in the structure to be bound with each other to be capable of making the reinforcing effect of the first reinforced fibers sufficient and thus satisfying the mechanical properties, particularly the flexural modulus of the structure. On the other hand, the structure having a volume content of the first resin of 85 vol % or less is preferable because it does not inhibit formation of the voids.

The structure preferably has a volume content of the voids in the range of 10 vol % or more and 97 vol % or less. The structure having a volume content of the voids of 10 vol % or more is preferable because it reduces its density to be capable of satisfying the lightness. On the other hand, the structure having a volume content of the voids of 97 vol % or less is preferable because it sufficiently increases the thickness of the first resin coating the periphery of the first reinforced fibers to enable sufficient reinforcement of mutual first reinforced fibers in the structure and increase the mechanical properties.

The structure of the present invention preferably has a specific flexural rigidity in a range of 3 or more and 20 or less, the specific flexural rigidity being represented by $Ec^{1/3} \cdot \rho^{-1}$ with the flexural modulus defined as Ec and the density defined as $\rho$, and the structure preferably has a flexural modulus Ec of 3 GPa or more, from a viewpoint of balance between the flexural rigidity and the lightness of the composite structure formed. The structure having a specific flexural rigidity of less than 3 has a high density even though having a high flexural modulus and is sometimes incapable of obtaining a desired effect of reducing weight. On the other hand, the structure having a specific flexural rigidity of more than 20 indicates having a low flexural modulus even though having a sufficient effect of reducing weight, and sometimes have trouble retaining a shape desired as the structure or is sometimes inferior in flexural modulus of itself. Steel and aluminum generally have a specific flexural rigidity of 1.5 or less, and thus, the structure in the composite structure according to the present invention has a much more excellent specific flexural rigidity than the specific flexural rigidity of these metal materials. The structure in the composite structure according to the present invention has a specific flexural rigidity of preferably 4 or more, further preferably 5 or more in terms of balance between the effect of reducing weight and the specific flexural rigidity.

The structure has a flexural modulus Ec of preferably 3 GPa or more, more preferably 6 GPa or more. The structure having a flexural modulus Ec of less than 3 GPa sometimes causes a limitation on a range of forming the composite structure. Further, the structure preferably has an isotropic flexural modulus to facilitate designing of the composite structure. An upper limit of the flexural modulus is not set. In the structure containing the first reinforced fibers and the first resin, however, the upper limit can be generally a value calculated from the elastic moduli of the constituent components of the structure, i.e., the first reinforced fibers and the first resin. In the structure of the present invention, members are designed using the flexural modulus of the structure itself, and a flexural modulus of 5 GPa suffices for practical use.

The first reinforced fibers of the present invention are discontinuous fibers and have a thickness wise average fiber orientation angle in a range of 5° to 60°. The first reinforced fibers that are discontinuous fibers facilitate formation of the structure into a complicated shape when an external force is applied to the structure for molding. Further, the first reinforced fibers having a thickness-wise average fiber orientation angle in the range of 5° to 60° densify the voids formed by the first reinforced fibers, are capable of efficiently generating the voids, and facilitate control of the density of the structure. That is, in the structure, the first reinforced fibers that are discontinuous fibers and have an average fiber orientation angle in the specific range are capable of minimizing a mechanically weak portion that can be generated at an end of a fiber bundle of the first reinforced fibers in the structure, to impart isotropy in addition to excellent reinforcing efficiency and reliability.

It is possible to measure the fiber orientation angle of the first reinforced fibers in the structure in the same manner as the fiber orientation angle of the second reinforced fibers in the laminate.

The first reinforced fibers are preferably dispersed in nearly monofilaments and randomly to enable homogenization of the structure and securement of stability of the flexural rigidity. Here, the phrase "in nearly monofilaments" refer to existing as fine-denier strands having less than 500 reinforced fiber single yarns. The first reinforced fibers are further preferably dispersed in monofilaments.

The first reinforced fibers of the present invention preferably have a form of a non-woven fabric from a viewpoint of easy impregnation of the periphery of the first reinforced fibers with the first resin. The first reinforced fibers having a form of a non-woven fabric is preferable because they not only give easy handling of the non-woven fabric itself but are also capable of facilitating impregnation even when thermoplastic that is generally regarded as having high viscosity is used as the first-resin. Here, the "form of a non-woven fabric"-refers to a form in which strands and/or monofilaments of the first reinforced fibers are dispersed irregularly and planarly, and examples of the form include a chopped strand mat, a continuous strand mat, a papermaking mat, a carding mat, and an air-laid mat (hereinafter, these mats are collectively referred to as fiber-reinforced mats).

Examples of a method for manufacturing a fiber-reinforced mat contained in the structure include a method for manufacturing a fiber-reinforced mat by dispersing the first reinforced fibers in strands and/or nearly monofilaments in advance. Known techniques as the method for manufacturing a fiber-reinforced mat are, for example, a dry process such as an air-laid method for forming the first reinforced fibers into a dispersion sheet by an air flow or a carding method for forming the first reinforced fibers into a sheet while mechanically carding the first reinforced fibers and putting the first reinforced fibers into a shape, and a wet process of stirring the first reinforced fibers in water, followed by paper making. Examples of means of bringing the first reinforced fibers further closer to monofilaments in the dry process include a method for providing fiber-opening bars, a method for further vibrating the fiber-opening bars, a method for further making the teeth of a card fine, and a method for adjusting the rotation rate of a card. Examples of the means in the wet process include a method for adjusting the conditions for stirring the first reinforced fibers, a method for diluting the concentration of the reinforced fibers in a dispersion liquid, a method for adjusting the viscosity of a dispersion liquid, and a method for suppressing a vortex flow when the dispersion liquid is transferred. Particularly, the fiber-reinforced mat is preferably manufactured by the wet process. It is possible to easily adjust the proportion of the first reinforced fibers in the fiber-reinforced mat by increasing the concentration of the fibers charged or adjusting the flow rate (flow amount) of a dispersion liquid and the rate of a mesh conveyor. For example, decreasing the rate of a mesh conveyor with respect to the flow rate of a dispersion liquid makes the orientation of the fibers in the fiber-reinforced mat obtained less likely to be directed toward the pulling direction to enable manufacturing of a dense fiber-reinforced mat. The fiber-reinforced mat may be formed of the first reinforced fibers alone, a mixture of the first reinforced fibers with a powder or fibrous matrix resin component, a mixture of the first reinforced fibers with an organic compound or an inorganic compound, or the first reinforced fibers that are sealed with each other by a resin component.

The fiber-reinforced mat may be impregnated with the first resin in advance to prepare a structure precursor. As a method for manufacturing such a structure precursor, it is preferable to use a method for applying pressure on the fiber-reinforced mat together with the first resin that has been heated at a melting or softening temperature or higher and impregnating the fiber-reinforced mat with the first resin, from a viewpoint of easy manufacturing. Specifically, preferable examples of the method include a method for disposing the first resin on both thickness-wise sides of the fiber-reinforced mat to form a laminated product and performing melt impregnation on the fiber-reinforced mat with the first resin.

As equipment for implementing the above methods, it is possible to suitably use a compression molding machine or a double belt press. The former is used for a batch-type method, and it is possible to improve the productivity by employing an intermittent-type press system including two or more machines for heating and cooling in combination. The latter is used for a continuous-type method which enables easy continuous processing to be excellent in continuous productivity.

The structure of the present invention preferably contains carbon fibers as the first reinforced fibers and thermoplastic as the first resin. Use of carbon fibers as the first reinforced fibers is preferable because it enables formation of the structure excellent in balance between the mechanical properties and the lightness. Use of thermoplastic as the first resin is preferable from viewpoints of easy manufacturing of the structure and easy adjustment of the thickness of the composite structure formed.

[First Reinforced Fibers and Second Reinforced Fibers]

Examples of the first reinforced fibers contained in the structure and the second reinforced fibers contained in the laminate in the composite structure according to the present invention include metal fibers such as aluminum and stainless steel, PAN-based, rayon-based, lignin-based, or PITCH-based carbon fibers, graphite fibers, insulating fibers such as glass, organic fibers such as aramid, PBO, and polyphenylenesulfide, and inorganic fibers such as silicon carbide and silicon nitride. The first and second reinforced fibers may be those obtained by surface-treating these types of fibers. Examples of the surface treatment include, in addition to a treatment of depositing a metal as a conductor, a treatment with a coupling agent, a treatment with a sizing agent, a treatment with a banding agent, and a treatment of attaching an additive agent. These types of fibers may be used alone, or two or more types of fibers may be used in combination. Among these types of fibers, PAN-based, PITCH-based, or rayon-based carbon fibers that are excellent in specific strength and specific rigidity are preferably used from a viewpoint of an effect of reducing weight. Further, glass fibers are preferably used from a viewpoint of increasing economic efficiency of the structure obtained, and particularly, carbon fibers and glass fibers are preferably used in combination in terms of balance between the mechanical properties and the economic efficiency. Further, aramid fibers are preferably used from a viewpoint of increasing an impact absorbing property and formativeness of the structure obtained, and particularly, carbon fibers and aramid fibers are preferably used in combination in terms of balance between the mechanical properties and the impact absorbing property. Further, it is also possible to use reinforced fibers coated with a metal such as nickel, copper, or ytterbium from a viewpoint of increasing conductivity of the structure obtained. Among these types of fibers, it is possible to more preferably use PAN-based carbon fibers excellent in mechanical properties such as strength and elastic modulus.

[First Resin and Second Resin]

Examples of the first resin contained in the structure and the second resin contained in the laminate in the composite structure according to the present invention include thermoplastic and thermoset resin. In the present invention, thermoset resin may be blended with thermoplastic. In this case, the name of resin representing the first resin or the second resin is a component accounting for more than 50 mass % among components constituting the first resin or the second resin. When thermoset resin is used as the first resin, the thermoset resin in the structure means its cured product. In the same manner, when thermoset resin is used as the second resin, the thermoset resin in the laminate means its cured product.

The first resin and the second resin of the present invention can contain at least one type of thermoplastic. Examples of thermoplastic include crystalline resin such as polyesters (e.g., polyethylene terephthalate (PET), polybutylene terephthalate (PBT), polytrimethylene terephthalate (PTT), polyethylene naphthalate (PEN), and liquid crystal polyester), polyolefins (e.g., polyethylene (PE), polypropylene (PP), and polybutylene), polyoxymethylene (POM), polyamide (PA), polyarylene sulfides (e.g., polyphenylene sulfide (PPS)), polyketone (PK), polyetherketone (PEK), polyetheretherketone (PEEK), polyetherketoneketone (PEKK), polyether nitrile (PEN), fluorine-based resin (e.g., polytetrafluoroethylene), and liquid crystal polymer (LCP); amorphous resin such as styrene-based resin as well as polycarbonate (PC), polymethylmethacrylate (PMMA), polyvinylchloride (PVC), polyphenylene ether (PPE), polyimide (PI), polyamideimide (PAI), polyetherimide (PEI), polysulfone (PSU), polyethersulfone, and polyarylate (PAR); other materials such as phenolic resin, phenoxy resin, polystyrene-based, polyolefin-based, polyurethane-based, polyester-based, polyamide-based, polybutadiene-based, polyisoprene-based, or fluorine-based resin, and thermoplastic elastomers (e.g., acrylonitrile-based); and thermoplastic selected from copolymers and modified products of these types of resin. Among these types of thermoplastic, a polyolefin is preferable from a viewpoint of lightness of the composite structure obtained, polyamide is preferable from a viewpoint of strength, amorphous resin such as polycarbonate and styrene-based resin is preferable from a viewpoint of surface appearance, a polyarylene sulfide is preferable from a viewpoint of heat resistance, polyetheretherketone is preferable from a viewpoint of continuous use temperature, and fluorine-based resin is preferably used from a viewpoint of chemical resistance.

The first resin and the second resin of the present invention can contain at least one type of thermoset resin. Examples of thermoset resin include unsaturated polyester, vinyl ester, epoxy resin, phenolic resin, urea resin, melamine resin, a thermoset polyimide, copolymers and modified products of these types of resin, and blended resin of at least two of these types of resin. It is possible to preferably use epoxy resin from a viewpoint of mechanical properties of the composite structure obtained. It is possible to preferably use unsaturated polyester, vinyl ester, or epoxy resin from a viewpoint of a surface design. It is possible to preferably use phenolic resin from a viewpoint of flame retardancy.

The first resin and the second resin may contain an impact resistance improver such as elastomer or a rubber component or another filler or additive agent in a range without impairing the objects of the present invention. Examples of the filler and the additive agent include an inorganic filler, a flame retardant, a conductivity imparting agent, a nucleating-agent, an ultraviolet absorbing agent, an antioxidant, a damping agent, an antibacterial agent, a bug repellent, a deodorant, a coloring inhibitor, a thermostabilizer, a mold release agent, an antistatic agent, a plasticizer, a lubricant, a coloring agent, a pigment, a dye, a foaming agent, a defoamer, and a coupling agent.

The first resin contained in the structure of the present invention is preferably thermoplastic from viewpoints of shape formativeness and easy production of the structure. On the other hand, the second resin contained in the laminate is preferably thermoset resin from viewpoints of stability of the mechanical properties, reliability, and formativeness.

[Method for manufacturing composite structure]

Preferably employed for the composite structure according to the present invention is a manufacturing method at least including the following steps 1, 2, and 3 performed in this order, from viewpoints of easy manufacturing, control of the thickness of the composite structure manufactured, and a manufacturing rate:

step 1: laminating a laminate precursor on at least one surface of a structure precursor to form a laminated structure, the structure precursor containing thermoplastic as the first resin and the first reinforced fibers and containing substantially no voids, and the laminate precursor containing thermoset resin as the second resin and the second reinforced fibers;

step 2: disposing the laminated structure in molds having a flexure shape, an uneven shape (e.g., a boss), or a rib shape in at least the laminating direction of the laminated structure and curing the thermoset resin to form a composite-structure precursor while forming the laminated structure into the shape of the molds by heating and pressing; and step 3: adjusting a thickness of the composite-structure precursor while melting or softening the thermoplastic, to expand the structure precursor and thus form a structure, giving a composite structure.

The structure precursor "containing substantially no voids" used in the step 1 refers to the structure precursor having a volume content of the voids of 5 vol % or less. The structure precursor having a volume content of the voids of 5 vol % or less gives a sufficient flexural modulus in the step 1 even when having a small thickness, to satisfy handleability.

The thermoset resin in the laminate precursor used in the step 1 is uncured thermoset resin and is cured in the step 2.

The step 1 is a step obtaining a laminated structure formed by laminating the laminate precursor on the structure precursor. The step 2 is a step disposing the laminated structure obtained in the step 1 in a pair of male and female molds having a reinforcing or functional member shape such as a flexure shape, an uneven shape (e.g., a boss), or a rib shape and forming the laminated structure into the shape by heating and pressing. In the step 2, it is preferable to give the laminate structure sufficient heat for allowing the thermoset resin contained in the laminate to form a cross-linking structure for curing. The pressure in the step 2 is sufficient if only it allows the laminated structure, preferably the laminate precursor to flow into the protruding portion, and a pressure of 0.3 to 10 MPa suffices.

The step 3 is a step adjusting the thickness of the composite-structure precursor obtained in the step 2 while heating the composite-structure precursor, to expand the structure precursor and thus form a structure having voids, giving a composite structure. The heating temperature at this time is preferably high enough to give a sufficient amount of heat for melting or softening the thermoplastic contained in the structure, from viewpoints of controlling the thickness of the composite structure manufactured and of a manufacturing rate. Specifically, it is preferable to apply a temperature of 10° C. or more higher than the melting temperature of the thermoplastic (first resin) and of the pyrolysis temperature or lower of the thermoplastic (first resin). The pressure is sufficient if only it prevents the molds from opening during the control of thickness, and a pressure of 3 to 10 MPa suffices.

As a method for performing the steps 2 and 3, any method can be employed as long as it allows, by heating, the thermoset resin in the laminate precursor to form a cross-linking structure for curing and expands the thermoplastic in the structure precursor to enable control of the thickness of the composite structure to a target thickness. Exemplified as a preferable method from a viewpoint of simple manufacturing is a method for restraining the thickness of the composite-structure precursor with, for example, a metal plate or a method for controlling the thickness of the composite-structure precursor by pressure applied to the composite-structure precursor. As equipment for implementing the above methods, it is possible to suitably use a compression molding machine. When a batch-type method is used it is possible to improve the productivity by employing an intermittent-type press system including two or more machines for heating and cooling in combination.

The composite structure according to the present invention is preferably used for an automobile interior or exterior part, an electric or electronic device body, a bicycle, a structure material for sport goods, an aircraft interior material, and a transport box. In particular, the composite structure is especially suitable for a module member consisting of a plurality of components.

EXAMPLES

Hereinafter, the present invention is further specifically described by way of examples.

(1) Average fiber orientation angles of first reinforced fibers and second reinforced fibers in composite structure A laminate and a structure were extracted by grinding from composite structures produced in examples and comparative examples and a 25-mm-wide piece was cut out from the laminate and the structure.

The cut-out laminate and structure were each subjected to section observation to measure the average fiber orientation angles of the first reinforced fibers and the second reinforced fibers. The piece was embedded in epoxy resin and polished such that a section in parallel with the thickness direction is an observation surface, to produce a sample. The sample was observed with a laser microscope (VK-9510, manufactured by KEYENCE CORPORATION) at a magnification of 400 times.

The average fiber orientation angle of the laminate was observed such that the closest layer of the sample to the structure came along the fiber longitudinal direction of the second reinforced fibers. The measurement of the fiber orientation angle was performed by measuring, with the boundary surface between the laminate and the structure set as a standard level)(0°), the angles between the standard level and a total of 400 second reinforced fibers in the extracted observation sample, and obtaining an arithmetic average value of the measured values as the average fiber orientation angle of the second reinforced fibers.

(2) Ratio (as)/(Ap) Between Projected Area (Ap) of Surface (Referred to as Plane of Projection) Having Protruding Portion and Actual Survey Area of Plane of Projection (as) in Composite Structure As regards the composite structures produced in the examples and the comparative examples, an image vertical to a surface portion of the composite structure was obtained with a digital camera. The area of the surface portion was calculated from the scale of the obtained image and defined as a projected area (Ap). Next, the length, the depth, and the thickness of shapes (protruding portion) on the plane of projection were measured using a vernier caliper, and the area of the shapes was calculated from the measurement results, and the calculated area was defined as an actual survey area of the plane of projection (As). The ratio between the projected area (Ap) and the actual survey area of the plane of projection (As) was calculated by (As)/(Ap).

(3) Volume Content of Laminate in Protruding Portion

Only a protruding portion was removed by cutting from the composite structures. Next, the cut portion was cut out into 5 equal pieces. Section observation was performed on the pieces to measure the volume content of the laminate in the protruding portion. A length (L1) perpendicular to a surface (observation surface) in parallel with the thickness direction of the piece was measured by a micrometer in advance. Thereafter, the piece was embedded in epoxy resin and polished such that a section in parallel with the thickness direction is an observation surface, to produce a sample.

The sample was enlarged at a magnification of 200 times with a laser microscope (VK-9510, manufactured by KEYENCE CORPORATION) to observe the section, the obtained observation image was deployed with generally used image analysis software, and an area of the entire protruding portion (S1) was obtained using a program supplied in the software.

Thereafter, the laminate portion was extracted by the contrast confirmed in the observation image, and an area of the laminate portion (S2) was obtained in the same manner as described above, using the program in the generally used image analysis software. The obtained areas were substituted in the following formula to calculate a volume content of the laminate in the protruding portion, and an arithmetic average value of the measured pieces was calculated.

Volume content of laminate in protruding portion=$100-((S1-S2) \times L1)/(S1 \times L1)) \times 100$ (4) Variation in Volume Content of Second Reinforced Fibers in Laminate A laminate was extracted by grinding from the composite structures, and thereafter, the laminate was cut into a protruding portion and a portion other than the protruding portion. Next, the protruding portion was cut in 4 equal portions. The portion other than the protruding portion was cut out into a 25-mm square piece. When being less than 25 mm, the portion other than the protruding portion was cut out into 4 isometric pieces. The volume content of the second reinforced fibers was calculated in the same manner as in (3) except the cut-out dimension. Further, a standard deviation was calculated from the measured values of the volume content of the second reinforced fibers, the standard deviation was divided by an average value to calculate a coefficient of variation (CV value (%)) as an indicator of variability, and the coefficient of variation was defined as a variation in volume content.

(5) Ratio Between Mass Average Fiber Length of Second Reinforced Fibers in Laminate (Ls) and Mass Average Fiber Length of First Reinforced Fibers in Structure (Lc)

A laminate and a structure were extracted from the composite structures by grinding. Next, each of the laminate and the structure was heated in air at 500° C. for 30 minutes to burn off its resin component. The remaining reinforced fibers were spread as a sample on filter paper. The sample was enlarged at a magnification of 200 times with a laser microscope (VK-9510, manufactured by KEYENCE CORPORATION) to measure the fiber length of the sample. The mass average fiber lengths (Ls) and (Lc) were obtained from the obtained measurement results by the following formula, and the ratio between the mass average fiber lengths was calculated by the following formula.

Ratio in mass average fiber length between second reinforced fibers and first reinforced fibers=(Ls)/(Lc)

Mass average fiber length of first reinforced fibers (Lc) and mass average fiber length of second reinforced fibers (Ls)

Mass average fiber length=$\Sigma(Li \times Wi/100)$

Li: measured fiber length (i=1, 2, 3 . . . n)
Wi: fiber mass fraction of fiber length Li (i=1, 2, 3 . . . n)

(6) Volume Content of First Reinforced Fibers in Structure Vf

After a mass of the structure Ws was measured, the structure was heated in air at 500° C. for 30 minutes to burn off its resin component, a mass of the remaining first reinforced fibers Wf was measured, and the volume content of the first reinforced fibers was calculated by the following formula.

Volume content of first reinforced fibers $Vf$(vol %)= $(Wf/\rho f)/\{Wf/\rho f+(Ws-Wf)/\rho r\} \times 100$ ρf: density of first reinforced fibers (g/cm$^3$)
ρr: density of first resin (g/cm$^3$)

(7) Volume Content of Voids in Structure

A 10-mm square test piece was cut out from the structure, a section of the test piece was observed with a scanning electron microscope (SEM) (S-4800 type, manufactured by Hitachi High-Technologies Corporation), and the surface of the structure was imaged at 10 locations with an equal interval at a magnification of 1000 times. A void area $A_a$ in each of the images was obtained. A percentage of the voids was calculated by dividing the void area $A_a$ by the area of the entire image. The volume content of the voids in the structure was obtained by an arithmetic average of percentages of the voids at a total of 50 locations, 10 locations in each of 5 test pieces.

(8) Volume Content of First Resin in Structure

The volume content of the first resin was obtained by the following formula using the values of the volume content of the first reinforced fibers and the volume content of the voids in the structure that were obtained in (6) and (7).

Volume content of first resin $Vr(\text{vol }\%)=100-(Vf+Va)$

Vf: volume content of first reinforced fibers (vol %)
Va: volume content of voids (vol %)

(9) Flexural Modulus and Specific Flexural Rigidity of Structure

Test pieces were cut out from the structure and the flexural modulus was measured according to the ISO178 method (1993). The test pieces were produced by cutting the structure in four directions at 0°, +45°, −45°, and 90°, with any direction defined as 0°, each direction had a number of measured pieces of 5 (n=5), and an arithmetic average value was defined as an flexural modulus Ec. Used as a measuring device was an "INSTRON (registered trademark)" 5565 type universal material testing machine (manufactured by INSTRON JAPAN Co., Ltd.).

As the density, the apparent density of the above test pieces was measured with reference to JIS K7222 (2005). The length, width, and the thickness of each of the test pieces were measured by a micrometer, and a volume V of the test piece was calculated from the obtained values. In addition, a mass M of the test piece used for the measurement was measured by an electronic balance. The obtained mass M and volume V were substituted in the following formula to calculate a density ρ of the structure. $\rho[g/cm^3]=10^3 \times M [g]/V [mm^3]$ The flexural modulus Ec and the density p obtained above were substituted in the following formula to calculate a specific flexural rigidity of the structure. As the flexural modulus and the density, an arithmetic average of the measured pieces was obtained and used as a representative value.

Specific flexural rigidity $=Ec^{1/3}/\rho$

The following materials were used in the following examples and comparative examples.

[Carbon Fibers]

A copolymer containing polyacrylonitrile as a main component was subjected to spun processing, calcined processing, and surface oxidation treatment processing, and a total of 12,000 single yarns were obtained as continuous carbon fibers. The properties of the continuous carbon fibers were as follows.
Single fiber diameter: 7 μm
Density: 1.8
Tensile strength: 4600 MPa
Tensile elastic modulus: 220 GPa

[PP Resin]

A resin sheet was produced that was formed of 80 mass % of unmodified polypropylene resin ("Prime Polypro" (registered trademark) J105G manufactured by PRIME POLYMER Co., Ltd.) and 20 mass % of acid-modified polypropylene resin ("ADMER" QB510 manufactured by Mitsui Chemicals, Inc.) with a weight per unit area of 100 g/m². Table 1 shows the properties of the obtained resin sheet.

[PA6 resin]

A resin film was produced that was formed of nylon 6 resin ("AMILAN" (registered trademark) CM1021T manufactured by Toray Industries, Inc.) with a weight per unit area of 124 g/m². Table 1 shows the properties of the obtained resin film.

[PEs Resin]

A resin film was produced that was formed of polyester resin ("Hytrel" (registered trademark) SB754 manufactured by Toray Industries, Inc.) with a weight per unit area of 121 g/m². Table 1 shows the properties of the obtained resin film.

[Epoxy resin]

An uncured epoxy resin composition was prepared by heating and kneading, with a kneader, epoxy resin (30 parts by mass of "EPIKOTE (registered trade mark)" 828, 35 parts by mass of "EPIKOTE (registered trademark)" 1001, and 35 parts by mass of "EPIKOTE (registered trademark)" 154 manufactured by Japan Epoxy Resins Co., Ltd.) and 5 parts by mass of thermoplastic polyvinyl formal ("Vinylec (registered trademark)" K manufactured by CHISSO CORPORATION) to uniformly dissolve polyvinyl formal, and then kneading, with a kneader, 3.5 parts by mass of a curing agent dicyandiamide (DICY7 manufacture by Japan Epoxy Resins Co., Ltd.) and 7 parts by mass of a curing accelerator 4,4-methylenebis(phenyldimethylurea) ("OMICURE" (registered trademark) 52 from PTI Japan Limited). A resin film with a weight per unit area of 132 g/m² was produced from the uncured epoxy resin composition with a knife coater. Table 1 shows the properties of the obtained resin film.

[Structure A]

With use of the carbon fibers as the first reinforced fibers, the carbon fibers were cut with a strand cutter at 6 mm to give chopped carbon fibers. A dispersion liquid formed of water and a surfactant (polyoxyethylene lauryl ether (trade name) manufactured by NACALAI TESQUE, INC.) at a concentration of 0.1 mass % was prepared, and a fiber-reinforced mat was manufactured with use of the dispersion liquid and the chopped carbon fibers. A manufacturing device includes, as a dispersing tank, a 1000-mm diameter cylinder-shaped container having an opening cock at a lower portion of the container, and includes a linear transport part (inclination angle: 30°) connecting the dispersing tank to a paper-making tank. A stirrer is attached to an opening on an upper surface of the dispersing tank, and it is possible to charge the chopped carbon fibers and the dispersion liquid (dispersion medium) through the opening into the dispersing tank. The paper-making tank includes a mesh conveyor having a 500-mm wide paper-making surface at the bottom and has the mesh conveyor thereof connected to a conveyor capable of delivering a carbon fiber substrate (paper-making substrate). Paper making was performed with the concentration of the carbon fibers in the dispersion liquid set at 0.05 mass %. The carbon fiber substrate produced by the paper making was dried in a dry furnace at 200° C. for 30 minutes to give a fiber-reinforced mat. The weight per unit area of the mat was 50 g/m².

A laminated product was produced by disposing the fiber-reinforced mat and the PP resin as the first resin in an order of [first resin/fiber-reinforced mat/first resin/fiber-reinforced mat/first resin/fiber-reinforced mat/first resin/fiber-reinforced mat/fiber-reinforced mat/first resin/fiber-reinforced mat/first resin/fiber-reinforced mat/first resin/fiber-reinforced mat/first resin]. Next, the structure was subjected to the following steps (I) to (V) to give a structure A. Table 2 shows the properties of the structure A.

(I) The laminated product is disposed in a press-molding mold cavity that has been preliminarily heated at 230° C. and the molds are closed.

(II) Next, the molds are retained for 120 seconds and then further retained for 60 seconds while pressed at a pressure of 3 MPa.

(III) After the step (II), the mold cavity is opened and a metal spacer is inserted at an end of the cavity to adjust the thickness of an obtained structure to 3.4 mm.
(IV) Thereafter, the mold cavity is closely closed again, and the molds are cooled to a cavity temperature of 50° C. while the pressure is retained.
(V) The molds are opened and a structure is extracted.

[Structure B]

A structure B was obtained in the same manner as the structure A except that the first resin was changed from the PP resin to the PA6 resin, the preliminary temperature in the step (I) was changed from 230° C. to 260° C., and the cavity temperature in the step (IV) was change from 50° C. to 60° C. Table 2 shows the properties of the structure B.

[Structure C]

A structure C was obtained in the same manner as the structure A except that the first resin was changed from the PP resin to the PEs resin and the preliminary temperature in the step (I) was changed from 230° C. to 200° C. Table 2 shows the properties of the structure C.

[Structure D]

A laminated product was obtained in the same manner as the structure A by changing the first resin from the PP resin to the epoxy resin. Next, the laminated product was subjected to the following steps (I) to (V) to give a structure D. Table 2 shows the properties of the structure D.
(I) The laminated product is disposed in a press-molding mold cavity that has been preliminarily heated at 150° C. and the molds are closed.
(II) Next, the molds are further retained for 20 seconds while pressed at a pressure of 1 MPa.
(III) After the step (II), the mold cavity is opened and a metal spacer is inserted at an end of the cavity to adjust the thickness of an obtained structure to 3.3 mm, and then the molds are closed again and a pressure of 1 MPa is retained for 30 minutes.
(IV) Thereafter, the mold cavity is closely closed again, and the molds are cooled to a cavity temperature of 30° C. while the pressure is retained.
(V) The molds are opened and a structure is extracted.

[Structure E]

A structure E was obtained in the same manner as the structure A except that the thickness of the metal spacer used in the step (III) of manufacturing the structure A was changed from 3.4 mm to 6.8 mm. Table 2 shows the properties of the structure E.

[Structure F]

A fiber-reinforced mat was obtained in the same manner as the fiber-reinforced mat contained in the structure A except that with use of the carbon fibers as the first reinforced fibers, the carbon fibers were cut with a strand cutter at 15 mm to give chopped carbon fibers. Next, a structure F was obtained in the same manner as the structure A except that the thickness of the metal spacer used in the step (III) was changed from 3.4 mm to 1.1 mm. Table 2 shows the properties of the structure F.

[Structure G]

A fiber-reinforced mat was obtained in the same manner as the fiber-reinforced mat contained in the structure A except that with use of the carbon fibers as the first reinforced fibers, the carbon fibers were cut with a strand cutter at 0:5 mm to give chopped carbon fibers. Next, a structure G was obtained in the same manner as the structure A except that the thickness of the metal spacer used in the step (III) was changed from 3.4 mm to 1.7 mm. Table 2 shows the properties of the structure G.

[Structure H]

A structure H was obtained in the same manner as the structure A except that the thickness of the metal spacer used in the step (III) of manufacturing the structure A was changed from 3.4 mm to 1.0 mm. Table 2 shows the properties of the structure H.

[Laminate A]

With use of the epoxy resin film as the second resin, next, the epoxy resin film was layered on each of both surfaces of the carbon fibers that were unidirectionally aligned as the second reinforced fibers, followed by heating and pressing, to impregnate the carbon fibers with the epoxy resin and thus produce a prepreg having a weight per unit area of the carbon fibers of 125 $g/m^2$, a fiber volume content Vf of 60%, and a thickness of 0.125 mm.

On the prepreg, a linear cut in a direction of 15° with respect to the orientation direction of the carbon fibers was continuously inserted by an automatic cutting machine, and the prepreg was cut out into a size of 300×300 mm, thus giving a prepreg having regular cuts with an equal interval. A cut was not inserted in the 5-mm periphery of the prepreg having a size of 300×300 mm so as not to make the prepreg into pieces by continuous cuts (cuts were inserted only in a range of 290×290 mm). The length of the fibers divided by the cuts was 50 mm. Cut-out prepregs with cuts were laminated to form four layers [0°/90°/90°/0°], with the orientation direction of the second reinforced fibers defined as 0° direction and the direction rightward shifted by 90 degrees from the orientation direction of the second reinforced fibers defined as 90°, and thus give a laminate A. Table 3 shows the properties of the laminate A.

[Laminate B]

A laminate B was obtained in the same manner as the laminate A except that the length of the fibers by the cuts was set at 10 mm, and prepregs with cuts were laminated to form four layers [0°/−45°/90°/45°]. Table 3 shows the properties of the laminate B.

[Laminate C]

A laminate C was obtained in the same manner as the laminate A except that no cut was inserted. Table 3 shows the properties of the laminate C.

[Laminate D]

A laminate D was obtained in the same manner as the laminate A except that the cut angle was set at 30°, and prepregs with cuts were laminated to form four layers [0°/−45°/90°/45°]. Table 3 shows the properties of the laminate D.

[Laminate E]

A laminate E was obtained in the same manner as the laminate A except that the fiber volume content Vf was set at 70%. Table 3 shows the properties of the laminate E.

[Laminate F]

A laminate F was obtained in the same manner as the laminate A except that the cut length of the laminate was set at 150 mm, the fiber volume content Vf was set at 45%, and prepregs with cuts were laminated to form four layers [0°/0°/0°/0°]. Table 3 shows the properties of the laminate F.

Example 1

Molds for forming the composite structure has been processed to form a straight line-shaped rib having a width of 300 mm, a thickness of 2 mm, and a height of 20 mm, transversely in the planar center of a plate shape having a length of 200 mm and a width of 300 mm. The molds have a shear edge structure at an end thereof.

Step 1: a precursor of the structure A was used as the structure and the laminate A was used as the laminate. These members were laminated as [laminate A/precursor of structure A/laminate A] to give a laminated structure. Next, the laminated structure was disposed in a press-molding mold cavity that had been preliminarily heated at 150° C.

Step 2: next, the molds were closed, pressed at a pressure of 1 MPa, and further retained for 10 minutes while pressed.

Step 3: after the temperature of the mold cavity was raised to 220° C., the molds were opened, and a metal spacer was inserted at an end of the molds to adjust the thickness of a structure to 3.4 mm.

Step 4: thereafter, the mold cavity was closely closed again, and the molds were rapidly cooled to a cavity temperature of 50° C. while the pressure was retained at 3 MPa.

Step 5: the molds were opened and a composite structure was extracted.

In the composite structure obtained through the steps, a protruding portion (rib shape) protruded from the plate shape, and the second reinforced fibers derived from the laminate filled as far as the tip of the protruding portion. The precursor of the structure A had the thickness thereof adjusted by the step 4 and gave the same properties (density, volume content of each element in structure, flexural modulus, and specific flexural rigidity) as the structure A (Table). Table 4 shows the properties of the obtained composite structure.

Example 2

A composite structure was obtained in the same manner as in Example 1 except that a precursor of the structure C was used as the structure, the temperature was set at 200° C. in the step 3, and the laminated structure was formed by lamination in an order of [laminate A/precursor of structure C]. Table 4 shows the properties of the obtained composite structure. The structure in the obtained composite structure gave the same properties (density, volume content of each element in structure, flexural modulus, and specific flexural rigidity) as the structure C.

Example 3

Used as the molds were molds that had been processed to form a boss as a protrusion shape having φ100 mm, a thickness of 2 mm, and a height of 2 mm, in a planar center portion of a plate shape having a length of 200 mm and a width of 300 mm. A composite structure was obtained in the same manner as in Example 1 except that a precursor of the structure B and the laminate D were used as the laminated structure and the temperature was set at 240° C. in the step 3. Table 4 shows the properties of the obtained composite structure. The structure in the obtained composite structure gave the same properties (density, volume content of each element in structure, flexural modulus, and specific flexural rigidity) as the structure B.

Example 4

Used as the molds were box-shaped molds that had been processed to form an upright wall shape having a thickness of 1 mm and a height of 40 mm, on the periphery, or four sides of a plate shape having a length of 200 mm and a width of 300 mm. A composite structure was obtained in the same manner as in Example 1 except that a precursor of the structure A and the laminate B were used as the laminated structure. Table 4 shows the properties of the obtained composite structure. The structure in the obtained composite structure gave the same properties (density, volume content of each element in structure, flexural modulus, and specific flexural rigidity) as the structure A.

Example 5

Used as the molds were molds that had been processed to form, with a semispherical shape having a diameter of 150 mm and a height of 100 mm used as a base, a rib shape having a width of 100 mm, a thickness of 2 mm, and a height of 5 mm, in four directions, with an equal interval, from the top toward ends of the semispherical shape. A composite structure was obtained in the same manner as in Example 1 except that a precursor of the structure E and the laminate B were used as the laminated structure. Table 4 shows the properties of the obtained composite structure. The structure in the obtained composite structure gave the same properties (density, volume content of each element in structure, flexural modulus, and specific flexural rigidity) as the structure E.

Example 6

Used as the molds were the molds used in Example 4. A composite structure was obtained in the same manner as in Example 1 except that a precursor of the structure G and the laminate E were used as the laminated structure. Table 4 shows the properties of the obtained composite structure. The structure in the obtained composite structure gave the same properties (density, volume content of each element in structure, flexural modulus, and specific flexural rigidity) as the structure G.

Example 7

Used as the molds were the molds used in Example 1. A composite structure was obtained in the same manner as in Example 1 except that a precursor of the structure D and the laminate D were used as the laminated structure and the temperature was set at 150° C. in the step 3. Table 5 shows the properties of the obtained composite structure. The structure in the obtained composite structure gave the same properties (density, volume content of each element in structure, flexural modulus, and specific flexural rigidity) as the structure D.

Example 8

Used as the molds were the molds used in Example 1. A composite structure was obtained in the same manner as in Example 1 except that a precursor of the structure F and the laminate B were used as the laminated structure. Table 5 shows the properties of the obtained composite structure. The structure in the obtained composite structure gave the same properties (density, volume content of each element in structure, flexural modulus, and specific flexural rigidity) as the structure F.

Comparative Example 1

Used as the molds were the molds used in Example 1. A composite structure was obtained in the same manner as in Example 1 except that a precursor of the structure H and the laminate C were used as the laminated structure and the composite structure was obtained without the step 3 in Example 1. Table 5 shows the properties of the obtained composite structure. The structure in the obtained composite structure gave the same properties (density, volume content of each element in structure, flexural modulus, and specific flexural rigidity) as the structure H.

Comparative Example 2

Used as the molds were the molds used in Example 3. A composite structure was obtained in the same manner as in Example 1 except that a precursor of the structure A and the laminate C were used as the laminated structure. Table 5 shows the properties of the obtained composite structure. The structure in the obtained composite structure gave the same properties (density, volume content of each element in structure, flexural modulus, and specific flexural rigidity) as the structure A.

Comparative Example 3

Used as the molds were the molds used in Example 1. A composite structure was obtained in the same manner as in Example 1 except that a precursor of the structure F and the laminate F were used as the laminated structure. Table 5 shows the properties of the obtained composite structure. The structure in the obtained composite structure gave the same properties (density, volume content of each element in structure, flexural modulus, and specific flexural rigidity) as the structure F.

Comparative Example 4

Used as the molds were the molds used in Example 1. A composite structure was obtained in the same manner as in Example 1 except that a precursor of the structure E and the laminate E were used as the laminated structure. Table 5 shows the properties of the obtained composite structure. The structure in the obtained composite structure gave the same properties (density, volume content of each element in structure, flexural modulus, and specific flexural rigidity) as the structure E.

[Study]

The present examples clarify that all the produced composite structures resulted in having excellent shape formativeness because used were the composite structures including the structure that contained the first reinforced fibers and the first resin and the laminate that was disposed on at least one surface of the structure and had a plurality of layers containing the second reinforced fibers and the second resin and further because the first reinforced fibers contained in the structure were discontinuous fibers and had a thickness-wise average fiber orientation angle in a range of 5 to 60° and the second reinforced fibers contained in the laminate were discontinuous fibers and had a thickness-wise average fiber orientation angle in a range of 0 to 5°. Further, Examples 1, 2, 3, and 7 clarify that changing the type of the first resin in the structure does not affect the effects of the structure. Further, it is also clarified that all the produced composite structures result in having excellent shape formativeness. The composite structure obtained in each of the examples was not only excellent in lightness because the structure used had a density in a range of 0.01 to 1 g/cm$^3$, but was also small in variability of the product properties because the laminate had a variation in volume content of the reinforced fibers in a range of 0 to 10%. Further, it is clarified that the composite structure obtained in each of the examples is capable of including a functional component by having at least one protruding portion as the shape of the composite structure, the composite structure is excellent in mechanical properties, particularly flexural modulus because the second reinforced fibers and the second resin that are derived from the laminate fill the rib, the boss, or the upright wall as the protruding portion, and the composite structure is excellent in specific flexural rigidity due to the excellent flexural modulus together with the density of the structure.

On the other hand, Comparative Example 1 gave a composite structure having a large mass for the volume of the composite structure, because the composite structure was obtained without the step 3 in Example 1 to be incapable of generating voids in the structure portion. Further, the composite structures of Comparative Examples 1 and 2 were incapable of obtaining the reinforcing effects by the protruding portion, because the laminate contained continuous fibers without cuts to decrease the volume content of the laminate in the protruding portion. In Comparative Example 3, the laminate had cuts but had the layers thereof laminated only in [0°] direction to allow the pressure of the press molding to press the continuous fibers, making the continuous fibers incapable of forming a shape and thus making only the resin flow out. This increased the thickness-wise variation of the second reinforced fibers in the laminate. In Comparative Example 4, the laminate had a high volume content of the resin to generate some imperfect molding such as a blur on a surface of the composite structure and increase the variation in volume content of the second reinforced fibers in the laminate. These phenomena were considered to be due to imperfect molding and did not allow the desired properties to be obtained.

TABLE 1

|  |  | PP resin | PA6 resin | PEs resin | Epoxy resin |
|---|---|---|---|---|---|
| Type | — | Polypropylene | Nylon 6 | Polyester | Epoxy |
| Weight per unit area | g/m$^2$ | 100 | 124 | 121 | 132 |
| Density | g/cm$^3$ | 0.92 | 1.13 | 1.09 | 1.20 |
| Melting point | °C. | 165 | 225 | 160 | — |
| Softening point | °C. | — | — | 55 | — |

TABLE 2

|  |  | Structure A | Structure B | Structure C | Structure D | Structure E | Structure F | Structure G | Structure H |
|---|---|---|---|---|---|---|---|---|---|
| First reinforced fibers | Type | Carbon fibers | Carbon fibers | Carbon fibers | Carbon fibers | Carbon fibers | Carbon fibers | Carbon fibers | Carbon fibers |
| First resin | Type | PP | PA6 | PEs | Epoxy | PP | PP | PP | PP |
| Density | g/cm$^3$ | 0.36 | 0.42 | 0.41 | 0.44 | 0.18 | 1.00 | 0.72 | 1.08 |
| Mass average fiber length (Lc) | mm | 6 | 6 | 6 | 6 | 6 | 15 | 0.5 | 6 |

TABLE 2-continued

|  |  | Structure A | Structure B | Structure C | Structure D | Structure E | Structure F | Structure G | Structure H |
|---|---|---|---|---|---|---|---|---|---|
| Volume content of first reinforced fibers | Vol % | 6.7 | 6.7 | 6.7 | 6.7 | 3.3 | 18.3 | 13.4 | 20 |
| Volume content of first resin | Vol % | 26.6 | 26.6 | 26.6 | 26.6 | 13.4 | 72.6 | 53.3 | 80 |
| Volume content of voids | Vol % | 66.7 | 66.7 | 66.7 | 66.7 | 83.3 | 9.1 | 33.3 | None |
| Flexural modulus | GPa | 8.1 | 9.0 | 3.5 | 9.5 | 2.0 | 12.0 | 11.0 | 14.0 |
| Specific flexural rigidity | — | 5.58 | 4.95 | 3.70 | 4.81 | 7.00 | 2.29 | 3.08 | 2.23 |

TABLE 3

|  |  | Laminate A | Laminate B | Laminate C | Laminate D | Laminate E | Laminate F |
|---|---|---|---|---|---|---|---|
| Second reinforced fibers | Type | Carbon fibers | Carbon fibers | Carbon fibers | Carbon fibers | Carbon fibers | Carbon fibers |
| Second resin | Type | Epoxy resin | Epoxy resin | Epoxy resin | Epoxy resin | Epoxy resin | Epoxy resin |
| Volume content Vf | Vol % | 60 | 60 | 60 | 60 | 70 | 45 |
| Cut | W/or W/O | W/ | W/ | W/O | W/ | W/ | W/ |
| Mass average fiber length (Ls) | mm | 50 | 10 | Continuous fibers | 50 | 50 | 150 |
| Cut angle θ | ° | 15 | 15 | W/O | 30 | 15 | 15 |
| Number of layers | Layers | 4 | 4 | 4 | 8 | 4 | 4 |
| Angle between orientation directions of reinforced fibers in adjacent layers | ° | [0/90/90/0] | [0/−45/90/45] | [0/90/90/0] | [0/−45/90/45]s | [0/90/90/0] | [0] |

TABLE 4

|  |  | Example 1 | Example 2 | Example 3 | Example 4 | Example 5 | Example 6 |
|---|---|---|---|---|---|---|---|
| Structure | — | A | C | B | A | E | G |
| Average fiber orientation angle of first reinforced fibers | ° | 8 | 8 | 8 | 8 | 20 | 5 |
| Laminate | — | A | A | D | B | B | E |
| Average fiber orientation angle of second reinforced fibers | ° | 1 | 1 | 3 | 2 | 5 | 5 |
| Disposition in composite structure | — | [L/S/L] | [L/S] | [L/S/L] | [L/S/L] | [L/S/L] | [L/S/L] |
| Shape | — | Plate | Plate | Plate | Plate | Semisphere | Plate |
| Shape of protruding portion | — | Rib | Rib | Boss | Upright wall | Rib | Upright wall |
| Projected area (Ap) | mm$^2$ | 60000 | 60000 | 60000 | 60000 | 17663 | 60000 |
| Actual survey area of plane of projection (As) | mm$^2$ | 72060 | 72060 | 61381 | 139680 | 51180 | 139680 |
| Ratio (As)/(Ap) | — | 1.17 | 1.17 | 1.02 | 2.33 | 2.90 | 2.33 |
| Volume content of laminate in protruding portion | Vol % | 100 | 100 | 90 | 100 | 80 | 80 |
| Variation in volume content of second reinforced fibers | % | 5 | 5 | 2 | 2 | 8 | 10 |
| Ratio in mass average fiber length between second reinforced fibers and first reinforced fibers (Ls/Lc) | — | 8.3 | 8.3 | 8.3 | 1.7 | 1.7 | 100 |

TABLE 5

|  |  | Example 7 | Example 8 | Comparative Example 1 | Comparative Example 2 | Comparative Example 3 | Comparative Example 4 |
|---|---|---|---|---|---|---|---|
| Structure | — | D | F | H | A | F | E |
| Average fiber orientation angle of first reinforced fibers | ° | 12 | 5 | 3 | 8 | 5 | 20 |
| Laminate | — | D | B | C | C | F | E |
| Average fiber orientation angle of second reinforced fibers | ° | 1 | 5 | 0 | 0 | 10 | 10 |
| Disposition in composite structure | — | [L/S/L] | [L/S/L] | [L/S/L] | [L/S/L] | [L/S/L] | [L/S/L] |
| Shape | — | Plate | Plate | Plate | Plate | Plate | Plate |
| Shape of protruding portion | — | Rib | Rib | Rib | Boss | Rib | Rib |
| Projected area (Ap) | mm² | 60000 | 60000 | 60000 | 60000 | 60000 | 60000 |
| Actual survey area of plane of projection (As) | mm² | 72060 | 72060 | 72060 | 61381 | 72060 | 72060 |
| Ratio (As)/(Ap) | — | 1.17 | 1.17 | 1.17 | 1.02 | 1.17 | 1.17 |
| Volume content of laminate in protruding portion | Vol % | 60 | 100 | 30 | 30 | 60 | 40 |
| Variation in volume content of second reinforced fibers | % | 10 | 10 | Unmeasurable | Unmeasurable | 20 | 15 |
| Ratio in mass average fiber length between second reinforced fibers and first reinforced fibers (Ls/Lc) | — | 8.3 | 0.6 | Unmeasurable | Unmeasurable | 10.0 | 8.3 |

In the column "Disposition in composite structure" of the table, "L" represents a laminate and "S" represents a structure.

INDUSTRIAL APPLICABILITY

According to the present invention, it is possible to provide a composite structure having excellent formativeness and lightness and also having excellent flexural rigidity.

DESCRIPTION OF REFERENCE SIGNS 1, 1A, 1B: Composite structure
2: First resin
3: First reinforced fiber
4: Void
5, 5B: Structure
6-1, 6-2: Laminate (no reinforced fiber shown)
7: Rib (protruding portion)
7A: Boss (protruding portion)
7B: Protruding portion
8a, 8b, 8c, 8d: Flexure

The invention claimed is:

1. A composite structure comprising a structure that contains first reinforced fibers and first resin and a laminate that is disposed on at least one surface of the structure and has a plurality of layers containing second reinforced fibers and second resin, with the structure and the laminate integrated,
the first reinforced fibers being discontinuous fibers and having a thickness-wise average fiber orientation angle in a range of 5 to 60°,
the second reinforced fibers being discontinuous fibers and having a thickness-wise average fiber orientation angle in a range of 0 to 5° in the closest layer to the structure,
the structure having a density in a range of 0.01 to 1 g/cm³,
the laminate having a variation in volume content of the second reinforced fibers in a range of 0 to 10%, and
the composite structure having a protruding portion on a laminate's surface opposite from a laminate's surface in contact with the structure.

2. The composite structure according to claim 1, having a ratio (As)/(Ap) in a range of more than 1 and 2.5 or less between a projected area (Ap) of a surface (referred to as a plane of projection) having the protruding portion and an actual survey area of the plane of projection (As).

3. The composite structure according to claim 1, wherein the protruding portion is a rib and/or a boss.

4. The composite structure according to claim 1, wherein the protruding portion contains the laminate in a proportion of 80 vol % or more and 100 vol % or less.

5. The composite structure according to claim 1, wherein a ratio Ls/Lc is in a range of 1 to 50, with a mass average fiber length of the second reinforced fibers defined as Ls and a mass average fiber length of the first reinforced fibers defined as Lc.

6. The composite structure according to claim 1, wherein each layer in the laminate has substantially all the second reinforced fibers thereof divided by a cut and the second reinforced fibers divided by the cut have a mass average fiber length Ls in a range of 10 to 100 mm.

7. The composite structure according to claim 1, wherein the laminate has an angle in a range of 4° or more and 90° or less between an orientation direction of the second reinforced fibers in one layer and an orientation direction of the second reinforced fibers in another layer adjacent to the one layer.

8. The composite structure according to claim 6, wherein each layer in the laminate has an absolute value of an angle θ between the cut and the second reinforced fibers of 2 to 25°.

9. The composite structure according to claim 1, wherein each layer in the laminate has a fiber volume content of the second reinforced fibers Vf in a range of 45 to 65%.

10. The composite structure according to claim 1, wherein each layer in the laminate contains carbon fibers as the second reinforced fibers and thermoset resin as the second resin.

11. The composite structure according to claim 1, wherein the first reinforced fibers in the structure have a mass average fiber length of 1 to 15 mm.

12. The composite structure according to claim 1, wherein the structure contains voids, and the structure has a volume content of the first reinforced fibers in a range of 0.5 vol % or more and 55 vol % or less, a volume content of the first resin in a range of 2.5 vol % or more and 85 vol % or less, and a volume content of the voids in a range of 10 vol % or more and 97 vol % or less.

13. The composite structure according to claim 1, wherein the structure has a specific flexural rigidity in a range of 3 or more and 20 or less, the specific flexural rigidity being represented by $Ec^{1/3} \cdot \rho^{-1}$ with a flexural modulus defined as Ec and a density defined as ρ, and the structure has a flexural modulus Ec of 3 GPa or more.

14. The composite structure according to claim 1, wherein the structure contains carbon fibers as the first reinforced fibers and thermoplastic as the first resin.

15. A method for manufacturing the composite structure according to claim 1, the method at least comprising following steps 1, 2, and 3 in this order:

step 1: laminating a laminate precursor on at least one surface of a structure precursor to form a laminated structure, the structure precursor containing thermoplastic as first resin and first reinforced fibers and containing substantially no voids, and the laminate precursor containing thermoset resin as second resin and second reinforced fibers;

step 2: disposing the laminated structure in molds having a flexure shape, an uneven shape, or a rib shape in at least a laminating direction of the laminated structure and curing the thermoset resin to form a composite-structure precursor while forming the laminate precursor into the shape by heating and pressing; and step 3: adjusting a thickness of the composite-structure precursor while melting or softening the thermoplastic, to expand the structure precursor and thus form a structure.

* * * * *